United States Patent [19]
Ito

[11] Patent Number: 6,089,737
[45] Date of Patent: Jul. 18, 2000

[54] HEADLAMP FOR AUTOMOBILE

[75] Inventor: Takaya Ito, Shizuoka, Japan

[73] Assignee: Koito Manufacturing Co., Ltd., Tokyo, Japan

[21] Appl. No.: 09/100,880

[22] Filed: Jun. 22, 1998

[30]     Foreign Application Priority Data

Jun. 20, 1997  [JP]  Japan ..................................... 9-163995

[51] Int. Cl.⁷ ................................................. F21V 19/02
[52] U.S. Cl. ......................... 362/523; 362/287; 362/418; 362/428; 362/528; 362/531; 362/532
[58] Field of Search .................................... 362/523, 528, 362/529, 273, 418, 427, 531, 532, 287, 428

[56]           References Cited

U.S. PATENT DOCUMENTS 5,331,519  7/1994  Fujino .
5,541,815  7/1996  Nakamura .
5,647,659  7/1997  Mori ............................................ 362/66

*Primary Examiner*—Sandra O'Shea
*Assistant Examiner*—John A. Ward
*Attorney, Agent, or Firm*—Sughrue, Mion, Zinn, Macpeak & Seas, PLLC

[57]           ABSTRACT

A headlamp for an automobile comprising: a light source unit having a reflector and a light source mounted therein; a housing disposed rear the light source unit and secured to a vehicle body; an aiming mechanism interposed between the light source unit and the housing, for tiltably cantilevering the light source unit; a bracket secured to a rear surface of the light source unit, for connecting the aiming mechanism; and a rearwardly extending projection provided on the rear surface of the light source unit, wherein the rearwardly extending projection abuts against the bracket to prevent the deformation of the bracket due to the self-weight of the light source unit.

10 Claims, 7 Drawing Sheets

HEADLAMP FOR AUTOMOBILE

BACKGROUND OF INVENTION

The present invention relates to a headlamp for an automobile in which a light source unit with a light source mounted therein is tiltably supported by an aiming mechanism with respect to a housing which is mounted and fixed to a vehicle body, and more particularly to a headlamp for an automobile having a structure in which a light source unit is cantilevered by an aiming mechanism.

To describe a headlamp for an automobile by citing as an example a reflector-movable type headlamp in which a reflector is tiltably supported in a lamp body, as shown in FIGS. 8 and 9, the rear surface side of a reflector 202 on which a light source 206 is fitted is cantilevered with respect to a lamp body 201, i.e., a housing which is mounted and fixed to a vehicle body, by means of an aiming mechanism comprising two aiming screws 203 and 204 extending through the lamp body 201 in the depthwise direction as well as one tilting fulcrum 205.

A pair of brackets 202a and 202b are projectingly formed on upper left and right portions of the rear surface of the reflector 202, and a ball bearing nut 205a constituting the tilting fulcrum 205 is fitted in one bracket 202a, while a screw supporting nut 207, to which the aiming screw 204 is threadedly engaged, is fitted in the other bracket 202b. In addition, a boss 202c is projectingly provided at a position below the bracket 202a, a bracket 202d is threadedly fastened to this boss 202c, and a screw supporting nut 208, to which the aiming screw 203 is threadedly engaged, is fitted in the bracket 202d.

FIG. 8 is a front elevational view of the reflector, and the aiming screws 203 and 204 respectively extend perpendicular to the plane of the drawing. The aiming screws 203 and 204 are respectively supported rotatably on the rear surface wall of the lamp body 201, and supporting points (nuts 207 and 208) for supporting the reflector 202 by means of the aiming screws 203 and 204 are arranged, for example, perpendicular to the tilting fulcrum 205 as viewed from the front side of the lamp. Through the rotating operation of the aiming screws 203 and 204, the reflector 202 is tilted about a horizontal axis Lx (a straight line connecting the tilting fulcrum 205 and the nut 207) and a vertical axis Ly (a straight line connecting the tilting fulcrum 205 an the nut 208), respectively, so as to adjust an illuminating angle of the lamp.

Also in a unit-movable type headlamp in which a lamp body/reflector unit (hereafter simply referred to as the unit), whose reflector is integrally formed on an inner peripheral surface of a lamp body, is tiltably supported with respect to the lamp housing, the structure is also adopted in which the unit is cantilevered with respect to the lamp housing by means of an aiming mechanism having one tilting fulcrum and two aiming screws. The unit is tilted by the rotating operation of the two aiming screws so as to adjust the illuminating angle of the lamp.

Thus, with the headlamp for an automobile, by rotatingly operating the two aiming screws, the light source unit for setting the illuminating direction of the lamp is tilted vertically and horizontally with respect to the housing (the lamp body in the case of the reflector-movable type headlamp, and the lamp housing in the case of the lamp body/unit movable type headlamp), so as to adjust the illuminating angle of the lamp.

As described above, the brackets for connecting the aiming mechanism (203, 204, and 205) are provided on the rear side of the reflector, and are generally formed integrally on the reflector 202 formed of a synthetic resin, as shown at reference numerals 202a and 202b. However, there are cases where it is difficult to form the brackets integrally with the lamp body, depending on the shapes of the reflector and the brackets to be formed or due to the relationship with the position for mounting the aiming mechanism. In such a case, as shown in FIG. 9, the plate-shaped bracket 202d, which is formed separately from the reflector 202, is provided by being fixed by a screw.

However, since the reflector 202 is cantilevered by the aiming mechanism as described above, a pressing force Q1, which is attributable to the moment about the horizontal axis Lx (tilting fulcrum 205) due to the self-weight W of the light source unit (the reflector 202 with the light source 206 fitted thereon), acts particularly on the lower position among the three connecting portions between the reflector 202 and the aiming mechanism, i.e., on the bracket 202d connected to the aiming screw 203. For this reason and partly due to the fact that the position in the bracket 202c for being fixed to the reflector 202 and the position therein for connection to the aiming screw 203 are verticall offset, the aforementioned pressing force Q1 and a reaction force Q2 (=Q1) acting via the aiming screw 203 are applied to the bracket 202d. Hence, there are possibilities that the bracket 202d becomes deformed as shown by the imaginary line in FIG. 9, thereby making the smooth rotation of the aiming screw 203 difficult and making it impossible to effect aiming adjustment with high accuracy.

SUMMARY OF INVENTION

The present invention has been devised in view of the above-described problems, and its object is to provide a headlamp for an automobile which makes high-accuracy aiming adjustment possible by eliminating the deformation of the aiming-mechanism connecting bracket secured to the rear surface of the light source unit.

To attain the above object, there is provided a headlamp for an automobile comprising: a light source unit having a reflector and a light source mounted therein; a housing disposed rear the light source unit and secured to a vehicle body; an aiming mechanism interposed between the light source unit and the housing, for tiltably cantilevering the light source unit; a bracket secured to a rear surface of the light source unit, for connecting the aiming mechanism; and a rearwardly extending projection provided on the rear surface of the light source unit, wherein the rearwardly extending projection abuts against the bracket to prevent the deformation of the bracket due to the self-weight of the light source unit.

The rearwardly extending projection provided on the light source unit abuts against the bracket to which the aiming mechanism is connected, so as to support the load acting in the bracket due to the self-weight of the light source unit and prevent the deformation of the bracket.

In addition, in the headlamp for an automobile decribed above, the rearwardly extending projecting is provided in such a manner as to abut against a vicinity of an aiming-mechanism connecting portion of the bracket. The rearwardly extending projecting abuts against against a vicinity of the aiming-mechanism connecting portion which is a point of application of the force from the rear of the bracket, and effectively prevents the deformation of the bracket.

In addition, the bracket is formed in shape of a plate, and the rearwardly extending projection is formed in the shape of a tongue having a width substantially corresponding to the width of the bracket.

The bracket is formed in the shape of a plate, and facilitate the formation of the aiming-mechanism connecting portions. By setting the width of the rearwardly extending projection to be identical to the width of the bracket, the projection can be easily made to abut against the bracket. Further, as the rearwardly extending projection is formed in the shape of tongue, the space located rearwardly of the light source unit is prevented from becoming narrow.

In addition, the bracket is provided with a forwardly extending projection which abuts against a distal end of a rearwardly extending projection on a light source unit side. Hence, the length of the rearwardly extending projection on the light source unit side can be made short correspondingly.

In addition, the aiming mechanism is comprising one universal joint constituting a tilting fulcrum of the light source unit and at least one aiming screw for tilting the light source unit, the universal joint and/or the aiming screw is connected to the bracket secured to the light source unit and extending downward, and the rearwardly extending projection abuts against a lower extending end portion of the bracket.

The bracket to which the aiming mechanism is connected has a structure in which it is supported at its both ends by means of its portion secured to the light source unit and the rearwardly extending projection, so that the amount of deformation is small as compared with the conventional bracket of a cantilevered structure.

In addition, the aiming mechanism is comprising a universal joint constituting a tilting fulcrum of the light source unit as well as a vertical aiming screws and a horizontal aiming screw which are rotatably supported by the housing in such a manner as to be respectively spaced apart vertically and horizontally from the universal joint, project forward, and are respectively connected to the light source unit, the bracket being formed in a vertically elongated belt shape capable of connecting together the universal joint and the vertical aiming screw, the rearwardly extending projection being provided in such a manner as to abut against a vicinity of a lower one of two upper and lower aiming-mechanism connecting portions of the bracket.

Since both the aiming screw and the universal joint can be connected to a single bracket, the number of brackets provided on the light source unit is reduced.

The bracket is formed in the shape of a vertically elongated belt, and the bracket is liable to be deformed by that portion. However, the rearwardly extending projection provided on the light source unit abuts against a vicinity of the aiming-mechanism connecting portion, I.e., a point of application of force from the rear side of the bracket, thereby effectively preventing the deformation of the bracket.

In addition, the present invention is applied to a unit-movable type headlamp wherein the light source unit, which is constituted by a lamp body/reflector unit in which a front lens is integrally assembled to a lamp body having a reflector formed integrally on an inner peripheral surface thereof, is tiltably supported with respect to the lamp housing by means of the aiming mechanism. In addition, in claim 8, the present invention is applied to a reflector-movable type headlamp in which the light source unit is tiltably supported with respect to the lap body by means of the aiming mechanism.

In the unit-movable type headlamp, the front lens is also integrated as the light source unit, and the weight of the front lens also acts on the bracket as the load, so that the amount of deformation of the bracket is large by that portion. However, the rearwardly extending projection provided on the light source unit abuts against the bracket, so as to support the load acting in the bracket due to the secure weight of the light source unit and prevent the deformation of the bracket.

DETAILED DESCRIPTION OF PREFERRED EMBODIMENTS

Next, a description will be given of the embodiments of the present invention.

Figure 1:
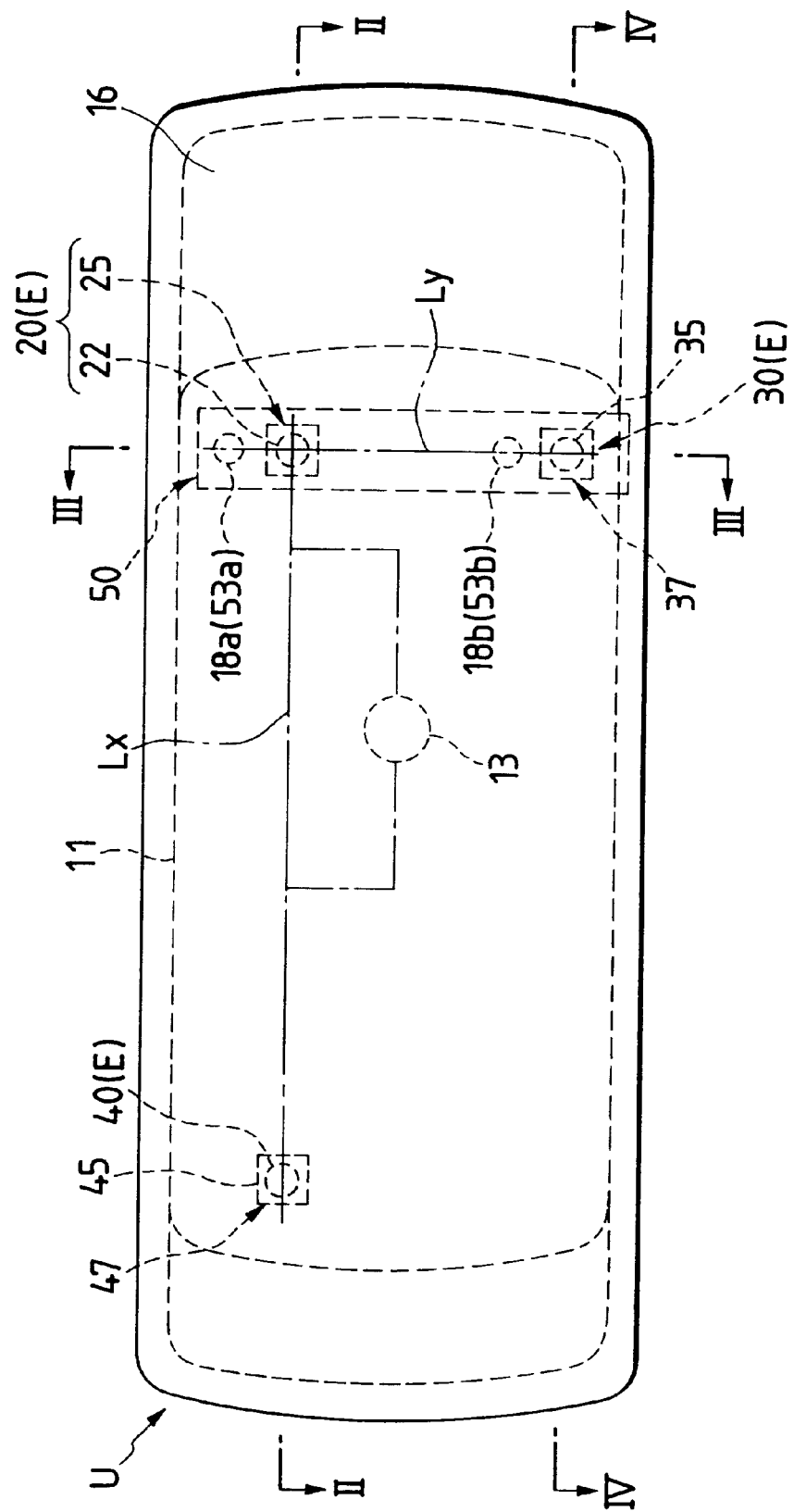
FIG. 1 is a front elevational view of a unit-movable type headlamp in accordance with a first embodiment of the present invention.
Figure 2:
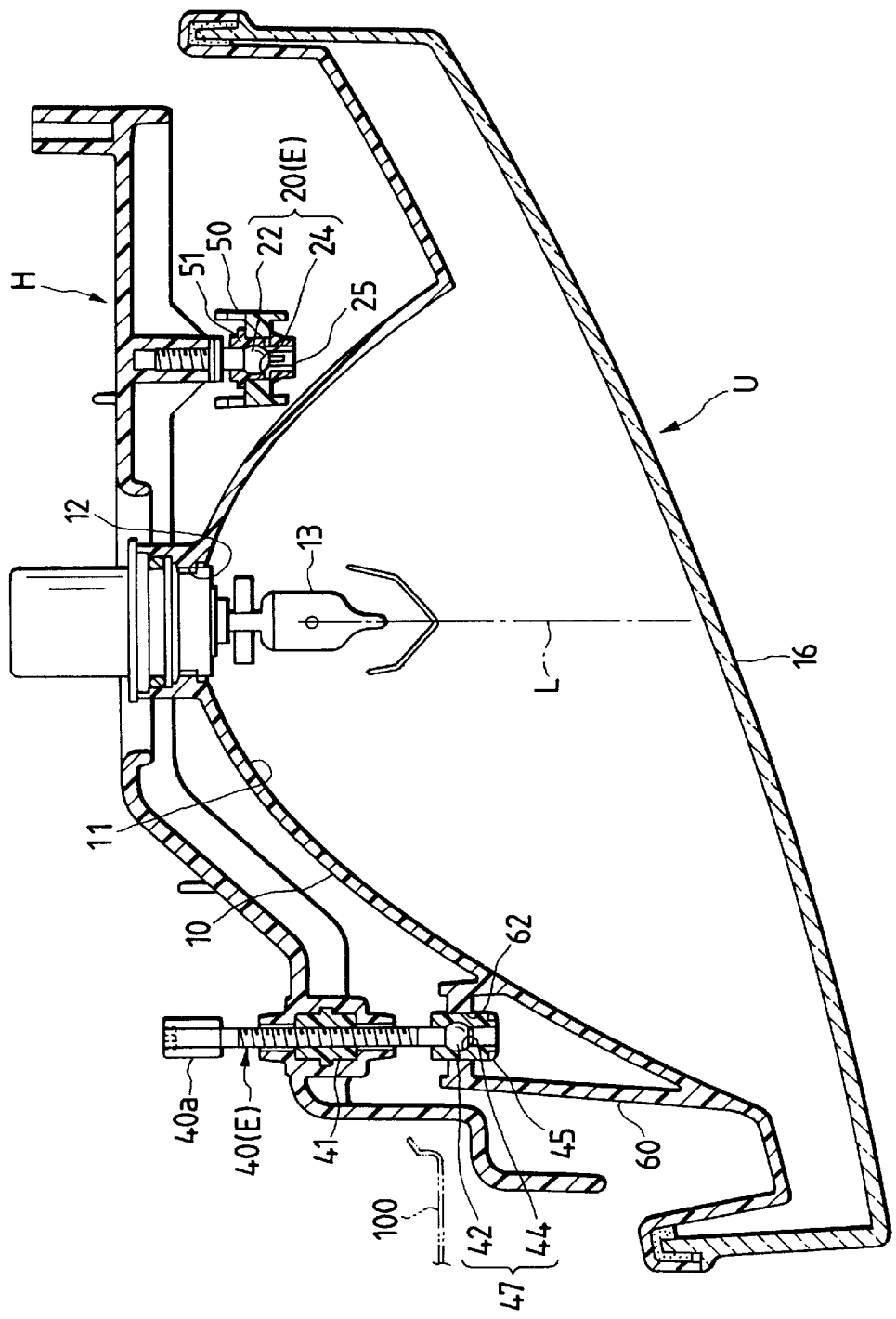
FIG. 2 is a horizontal cross-sectional view of the headlamp (cross-sectional view taken along line II—II shown in FIG. 1)
Figure 3:
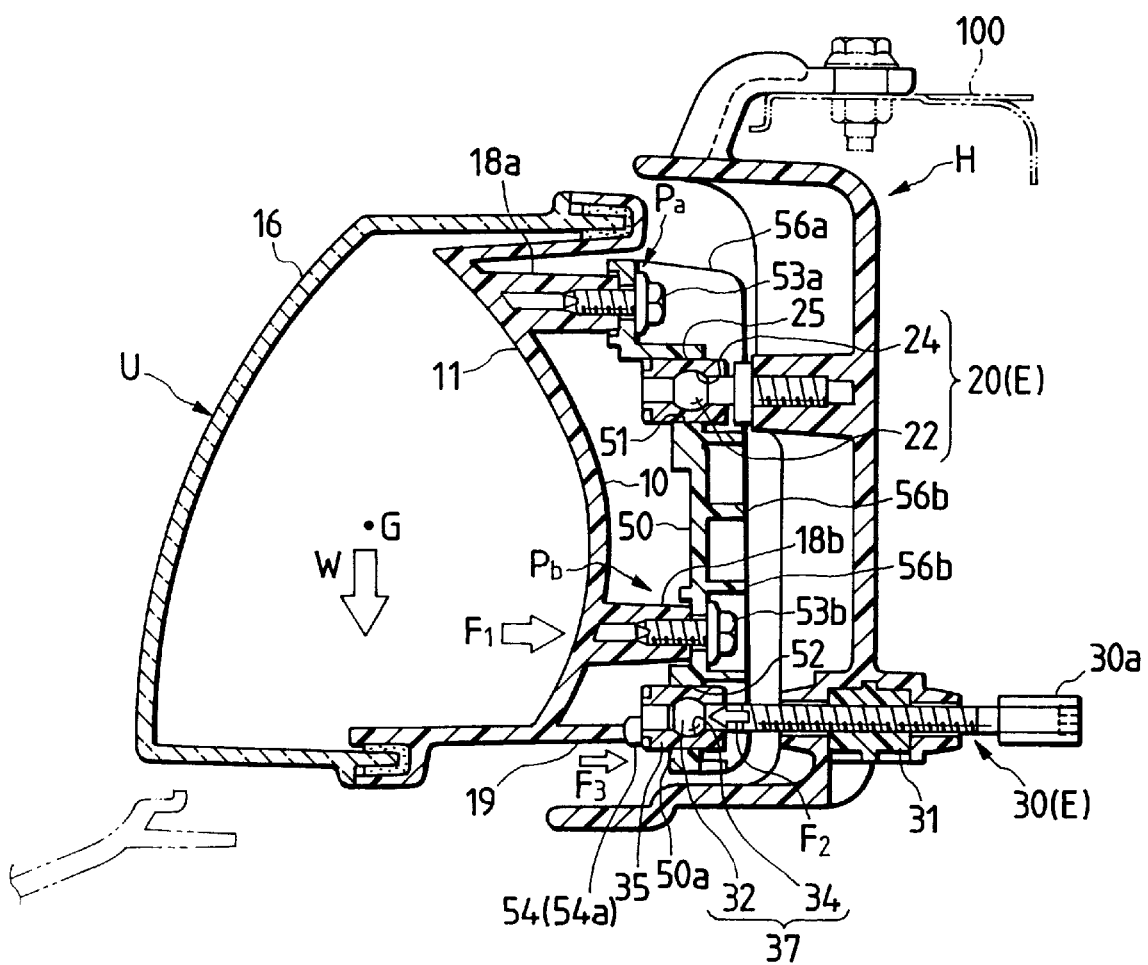
FIG. 3 is a vertical cross-sectional view of the headlamp (cross-sectional view taken along line III—III shown in FIG. 1)
Figure 4:
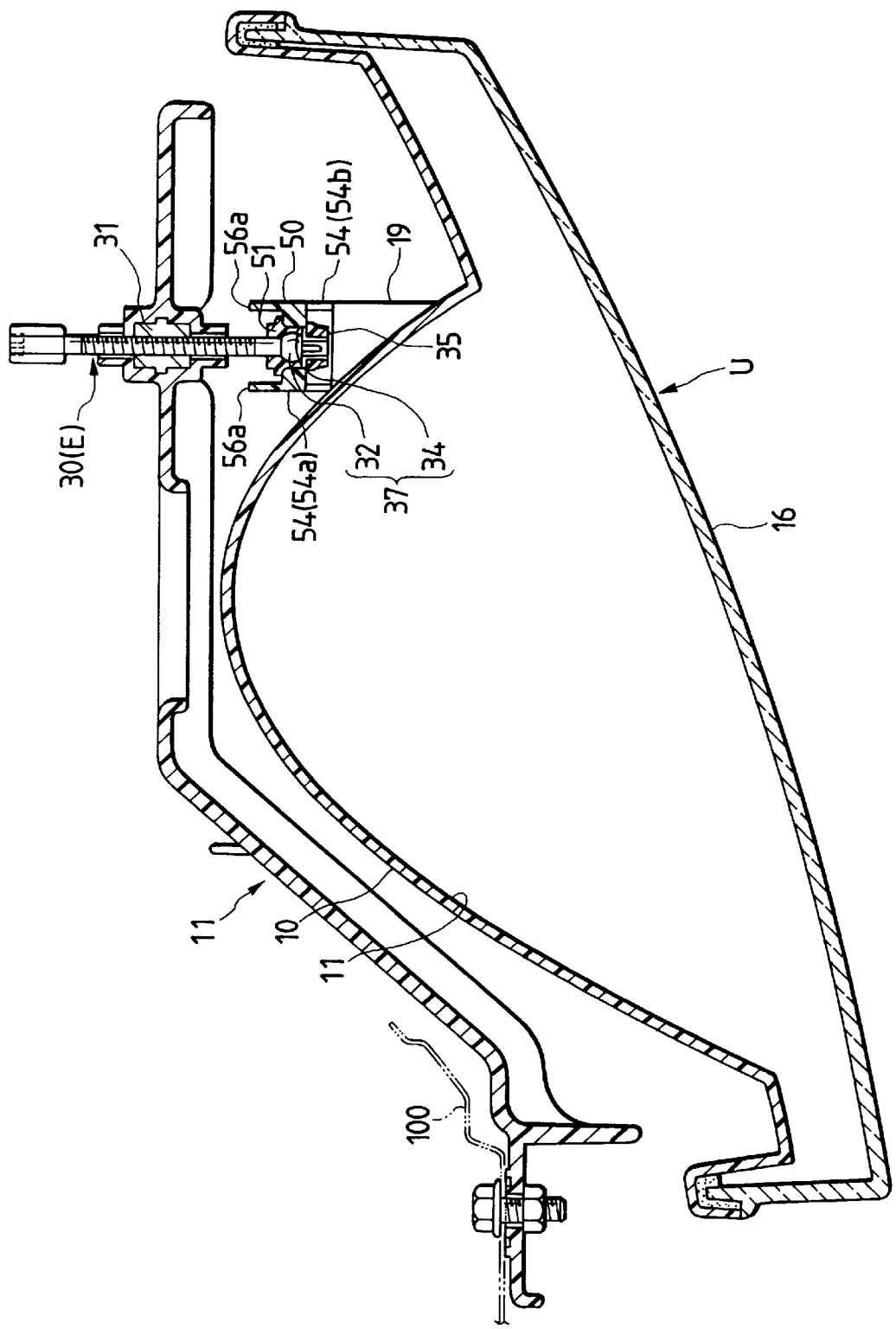
FIG. 4 is a horizontal cross-sectional view of the headlamp (cross-sectional view taken along line IV—IV shown in FIG. 1)
Figure 5:
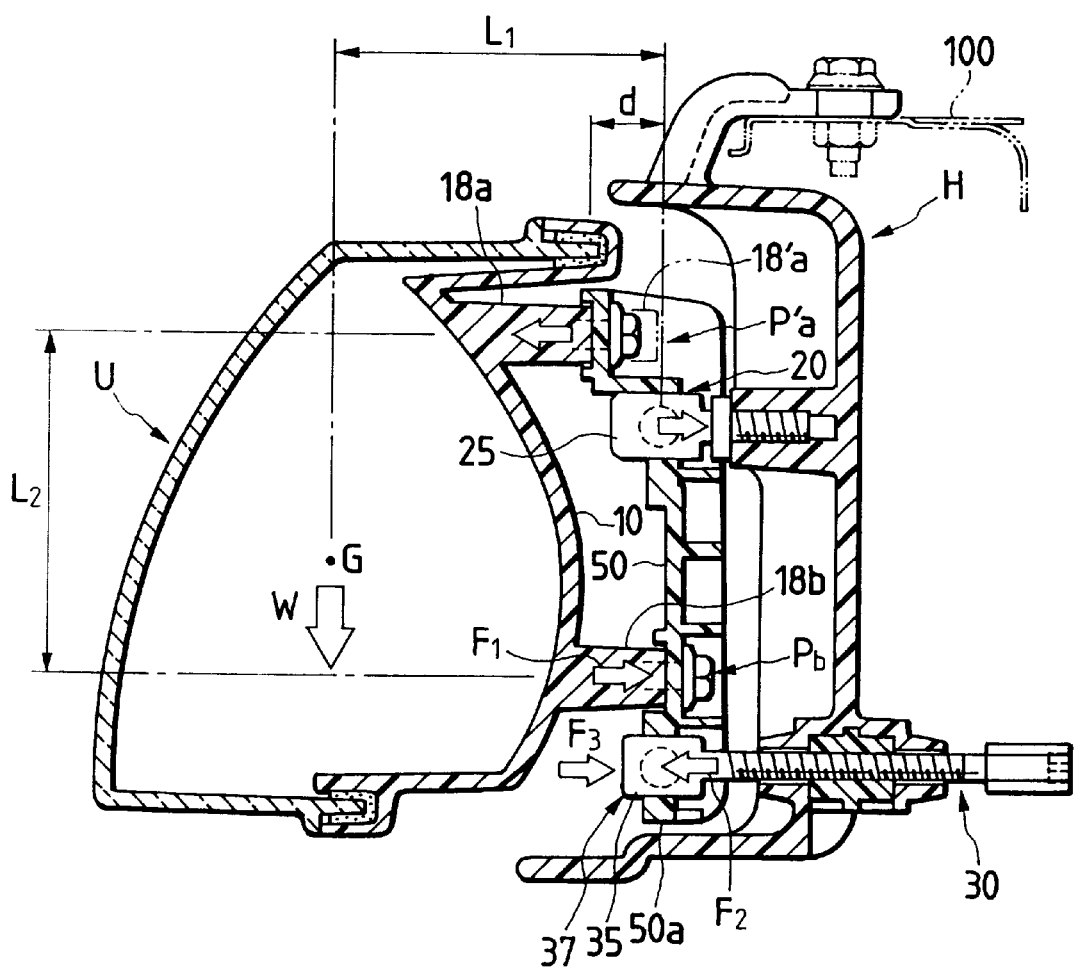
FIG. 5 is a diagram for explaining the force acting on a bracket to which an aiming mechanism is connected.

FIGS. 1 to 5 show an embodiment in which the present invention is applied to a unit-movable headlamp in which a lamp body/reflector unit (hereafter simply referred to as the unit) is tiltably provided with respect to a lamp housing (hereafter simply referred to as the housing) which is mounted and fixed to a vehicle body. FIG. 1 is a front elevational view of the unit-movable type beadlamp; FIG. 2 is a horizontal cross-sectional view of the headlamp (cross-sectional view taken along line II—II shown in FIG. 1); FIG. 3 is a vertical cross-sectional view of the headlamp (cross-sectional view taken along line III—III shown in FIG. 1); FIG. 4 is a horizontal cross-sectional view of the headlamp (cross-sectional view taken along line IV—IV shown in FIG. 1); and FIG. 5 is a diagram for explaining the force acting on a bracket to which an aiming mechanism is connected.

In these drawings, a container-shaped lamp body 10 is formed of a synthetic resin. A reflector 11 is formed integrally on an inner side thereof, a bulb inserting/securing hole 12 is provided at its head portion, and a bulb 13, i.e., a light source, is inserted and secured in the bulb inserting/securing hole 12. Further, a front lens 16 is assembled at a front opening portion of the lamp body 10, and is formed integrally as a light source unit U hereafter simply referred to as the unit).

As shown in FIGS. 1 to 4, on the front surface of a lamp housing (hereafter simply referred to as the housing) H formed in the form of an upright wall, the unit U is cantilevered by an aiming mechanism E comprising one ball joint 20, which is a tilting fulcrum, and two aiming screws (a vertical aiming screw 30 and a horizontal aiming screw 40). Incidentally, the housing H is secured to a vehicle body 100 by being fastened by bolts and nuts.

A ball portion 22 of the ball joint 20 is fixed to and supported by the housing H side, and a ball bearing nut 25 for forming a ball bearing portion 24 which engages with the ball portion 22 is inserted and secured in a nut inserting/securing hole 51 in a plate-shaped bracket 50 attached and fixed to the rear surface of the lamp unit U (lamp body 10). Thus, the structure provided is such that the unit U is capable of swinging (tilting) about this ball joint 20.

Further, the aiming screws 30 and 40 are supported by screw supporting nuts 31 and 41, which are prevented from rotating with respect to the housing H, in a state of being threadedly engaged therewith, and extend forward. A ball portion 32 formed at a forward end of the aiming screw 30 engages with a ball bearing portion 34 of a nut member 35 inserted and secured in a nut inserting/securing hole 52 of the bracket 50 attached and fixed to the unit U (lamp body 10). The ball portion 32 and the ball bearing portion 34 also form a ball joint 37.

Meanwhile, a ball portion 42 formed at a forward end of the aiming screw 40 engages with a ball bearing portion 44 of a nut member 45 inserted and secured in a nut inserting/securing hole 62 of a bracket 60 formed integrally with the unit U (lamp body 10). The ball portion 42 and the ball bearing portion 44 also form a ball joint 47.

Jig engaging portions 30a and 40a for engagement by a screwdriver or the like are formed at rear-end portions of the aiming screws 30 and 40, so that the aiming screws 30 and 40 can be rotatively operated on the rear surface side of the housing H. As the aiming screws 30 and 40 are rotated, the aiming screws 30 and 40 are advanced or retracted with respect to the nut members 31 and 41, and the unit-side ball bearing portions 24 and 34 (nut members 35 and 45) engaging with the ball portions 32 and 42 at the distal ends of the screws move back and forth integrally with the screws 30 and 40, thereby changing the inclination of the unit U.

Namely, if the aiming screw 30 is rotatively operated, the aiming screw 30 is advanced or retracted with respect to the housing H (nut 31) while rotating, and the unit U is tilled about the horizontal axis Lx connecting the ball joint 20, i.e., the tilting fulcrum, and the supporting point (ball joint 47) for supporting the unit U by means of the horizontal aiming screw 40. Hence, it is possible to adjust the vertical inclination of the unit U with respect to the housing H, i.e., the illuminating angle of the headlamp in the vertical direction.

On the other hand, if the aiming screw 40 is rotatively operated, the aiming screw 40 is advanced or retracted with respect to the housing H (nut 41) while rotating, and the unit U is tilted about the vertical axis Ly connecting the ball joint 20, i.e., the tilting fulcrum, and the supporting point (ball joint 37) for supporting the unit U by means of the vertical aiming screw 30. Hence, it is possible to adjust the horizontal inclination of the unit U with respect to the housing H, i.e., the illuminating angle of the headlamp in the horizontal direction. Thus, it is possible to adjust the tilting of the unit U, i.e., adjust the illuminating angle of the headlamp, by means of the two aiming screws 30 and 40.

In addition, the bracket 50 is formed in a vertically elongated belt shape so as to allow the ball joint 20 and the aiming screw 30 to be connected together, and its two portions respectively located at upper and lower positions are secured to bosses 18a and 18b provided projectingly on the rear surface of the lamp body 10 by using tapping screws 53a and 53b. The ball joints 20 and 37, i.e., connecting portions with respect to the aiming mechanism E, are provided at positions below the positions Pa and Pb where the bracket 50 is secured to the bosses 18a and 18b.

Furthermore, a tongue-shaped projection 19 for backing up the bracket 50 by abutting against a vicinity of a lower end portion of the bracket 50 is provided on the rear surface of the lamp body 10 at a position which is just opposite to the ball joint 37.

Namely, the bracket 50 projects downward from the position Pb where it is secured to the boss 18b, and this lower extending portion 50a is supported by the aiming screw 30. For this reason, in a case where the tongue-shaped projection 19 is not provided, a reaction force F2 of a pressing force F1, which is attributable to the moment about the tilting fulcrum (ball joint 20) due to the self-weight W of the unit, acts on the lower extending portion 50a of the bracket 50 via the aiming screw 30, as shown in FIG. 5. Hence, the lower extending portion 50a is deflected (deformed) such that the extended distal end side becomes the forward side, so that there are possibilities of the bracket 50 becoming permanently set or undergoing fatigue failure.

In this embodiment, however, as shown in FIG. 3, the tongue-shaped projection 19 abuts against the lower extending portion 50a of the bracket 50 to bear the reaction force F2, which is received from the aiming screw 30, on both sides at the boss 18b and the tongue-shaped projection 19. Therefore, the deformation of the lower extending portion 50a of the bracket 50 becomes small.

Further, the direction in which the tongue-shaped projection 19 extends and the direction in which the aiming screw 30 extends coincide with each other, and the line of action of a force F3 acting on the bracket 50 from the tongue-shaped projection 19 and the line of action of the force F2 acting on the bracket 50 from the aiming screw 30 are aligned with each other. Therefore, practically no deflection occurs in the lower extending portion 50a of the bracket 50.

In addition, as shown in FIGS. 3 and 4, a forwardly extending projection 54, which is formed by a horizontal pair of vertical walls 54a and 54b for abutment against the distal end portion of the tongue-shaped projection 19, is provided at the lower extending portion 50a of the bracket 50, so that a measure is provided to prevent the tongue-shaped projection 19 from undergoing large deformation. Namely, although it is possible to provide an arrangement in which the amount of projection of the tongue-shaped projection 19 is made large to cause the projection 19 to directly abut against the lower extending portion 50a of the bracket 50, there are numerous problems in that molding is difficult by the portion in which the projection 19 is elongated, and the thickness must also be made large to prevent deformation against the acting compressive force. Accordingly, by providing the projection 54 on the bracket 50 side as well, the tongue-shaped projection 19 can be short by that portion, the molding is facilitated correspondingly, and the thickness can be small. Further, as the projection 54 on the bracket 50 side is formed by the horizontal pair of vertical walls 54a and 54b, there is an advantage in that the structural strength of the projections 19 and 54 for backing up the lower extending portion 50a of the bracket 50 also becomes high.

A pair of vertically extending reinforcing frames 56a are formed at side edges on the left and right sides of the rear surface of the bracket 50, and reinforcing frames which extend horizontally at predetermined vertical intervals are formed. Thus, the bracket 50 is provided with the structure of enhanced rigidity and strength.

An L-shaped forwardly bent portion is formed at an upper end of the bracket 50, and the position Pa where the bracket 50 is secured to the boss 18a is located at a position close to the gravity G side of the unit U. Thus, the arrangement is provided so that the load acting on the lower extending portion 50a of the bracket 50 becomes small.

Namely, if the bracket 50 has a vertically straight shape, the boss 18a would be at a position designated at 18a' shown in FIG. 5, so that the moment M' acting about the position Pa' where the bracket 50 is secured to the boss 18a would become such that M'=WL1. Consequently, a pressing force, F'=WL1/L2, would act at the position Pb where the bracket 50 is secured to the boss 18b.

In this embodiment, on the other hand, the moment M acting about the position Pa where the bracket 50 is secured to the boss 18a is such that M=W(L1 −d), and a pressing force F1=W(L1−d), acts at the position Pb where the bracket 50 is secured to the boss 18b. This pressing force F1 is, of course, smaller than F1'.

Accordingly, the force F2(=F1) acting on the lower extending portion 50a of the bracket 50 from the aiming screw 30 also becomes small, so that the deformation of the lower extending portion 50a is made correspondingly small according to this structure.

Figure 6:
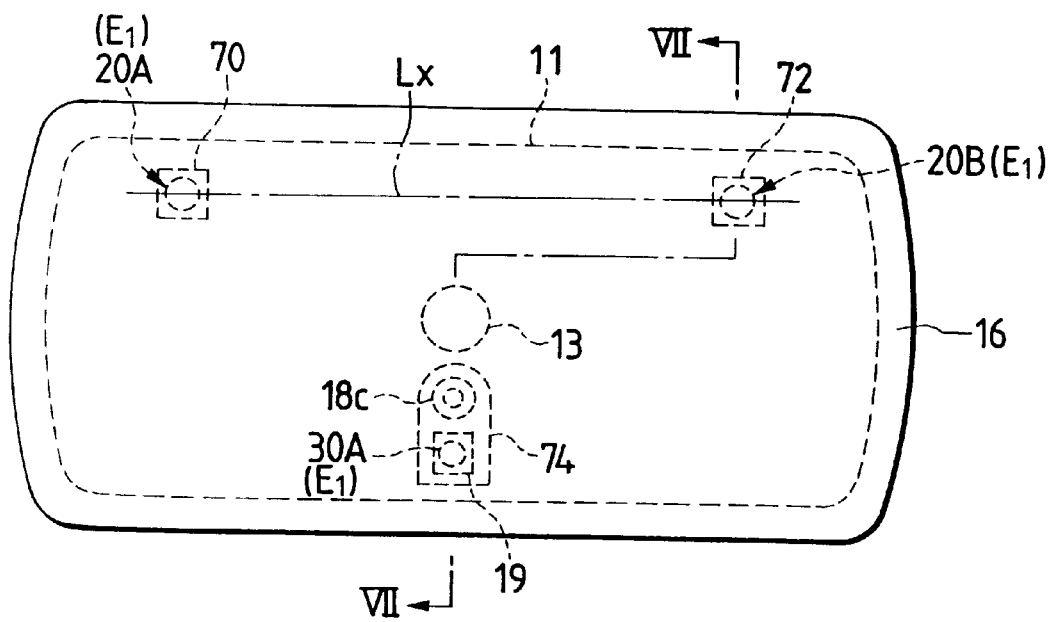
FIG. 6 is a front elevational view of a reflector-movable type headlamp in accordance with a second embodiment of the present invention.
Figure 7:
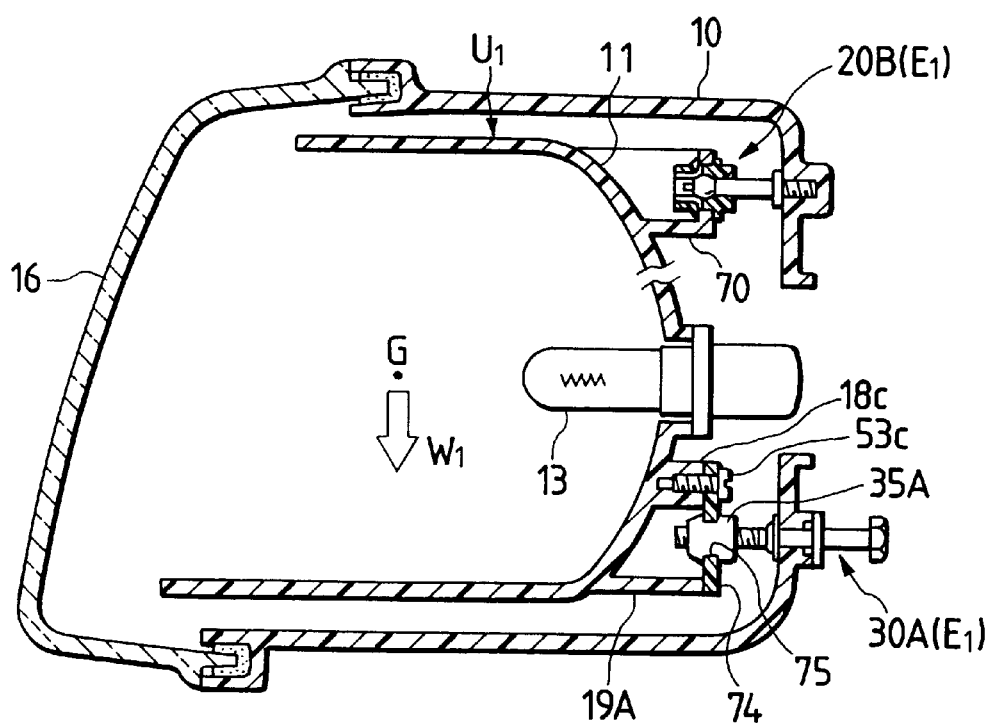
FIG. 7 is a vertical cross-sectional view of the headlamp (cross-sectional view taken along line VII—VII shown in FIG. 6)
Figure 8:
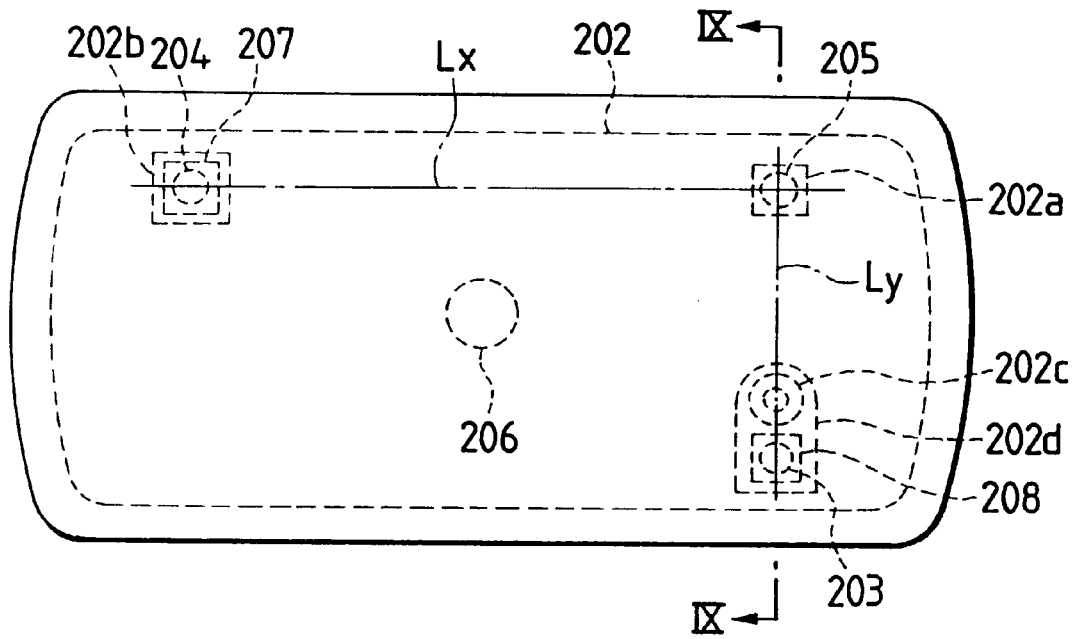
FIG. 8 is a front elevational view of a conventional headlamp.
Figure 9:
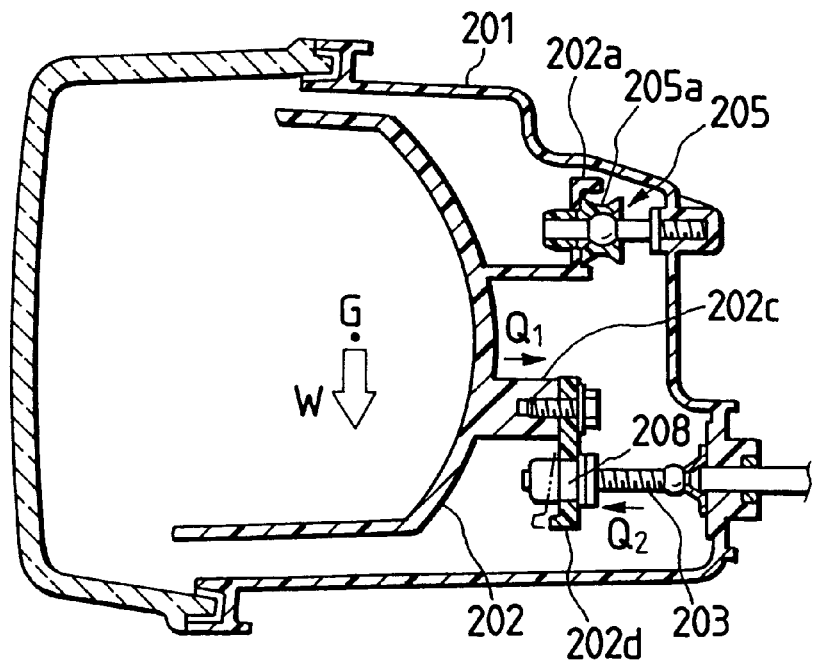
FIG. 9 is a vertical cross-sectional view of the headlamp (cross-sectional view taken along line IX—IX shown in FIG. 8).

FIGS. 6 and 7 show a second embodiment of the present invention, in which FIG. 6 is a front elevational view of a reflector-movable type headlamp in accordance with the second embodiment, and FIG. 7 is a vertical cross-sectional view of the headlamp (cross-sectional view taken along line VII—VII shown in FIG. 6).

Reference numeral 10 denotes the container-shaped lamp body, and the front lens 16 is assembled at its front opening portion, thereby forming a light chamber space. Inside the light chamber space lamp body 10), a light source unit U1, in which the light source 13 is mounted and integrated on the parabolic reflector 11, is tiltably cantilevered by an aiming mechanism El having two ball joints 20A and 20B and one aiming screw 30.

A pair of brackets 70 and 72 are formed on upper left and right portions of the rear surface of the reflector 11, and the ball joints 20A and 20B are respectively interposed between, on the one hand, the brackets 70, 72 and, on the other hand, the lamp body 10, and constitute tilting fulcrums for the unit U1.

On the other hand, a boss 18c is formed in the center of a lower portion of the rear surface of the reflector 11, and a plate-shaped bracket 74 for connecting the aiming screw 30 is secured to this boss 18c by means of a tapping screw 53c. A screw supporting nut 35A is inserted and secured in a nut inserting/securing hole 75 provided in a lower extending portion of the bracket 74. An aiming screw 30A supported rotatably by the lamp body 10 and projecting forward is threadedly engaged with the nut 35A.

As the aiming screw 30A is rotated, the nut 35A is advanced or retracted along the screw 35A. As a result, the unit U1 is tilted about a horizontal axis Lx connecting the ball joints 20A and 20D, thereby making it possible to tilt and adjust the illuminating angle of the lamp in the vertical direction.

In addition, a tongue-shaped rearwardly extending projection 19A which abuts against the bracket 74 is formed on the rear surface of the reflector 11, so as to prevent the deformation acting in the bracket 74 which is attributable to the moment about the horizontal axis Lx due to the self-weight W1 of the unit U1.

As is apparent from the foregoing description, in accordance with the headlamp for an automobile in the present invention, the bracket to which the aiming mechanism is connected is backed up by the rearwardly extending projection provided on the light source unit so as not to be deformed. Therefore, the aiming screw can be rotatively operated smoothly, and high-accuracy aiming adjustment becomes possible.

In addition, since the deformation of the bracket to which the aiming mechanism is connected can be prevented effectively, smooth rotation of the aiming screw and high-accuracy aiming adjustment become possible.

In addition, the connecting portions can be formed simply in the bracket, and the bracket can be reliably backed up by the rearwardly extending projection. In addition, since there is no possibility of the bracket and the rearwardly extending projection interfering with other members, smooth aiming is not hampered.

In addition, since the length of the rearwardly extending projection on the light source unit side can be made short, it is possible to facilitate the formation of the projection and, hence, the formation of the lamp body and the reflector which are component members of the light source unit.

In addition, since the bracket to which the aiming mechanism is connected is supported on at its opposite ends by means of its portion secured to the light source unit and the rearwardly extending projection, the amount of deformation is small as compared with the conventional bracket of a cantilevered structure. Correspondingly, smooth rotation of the aiming screw and high-accuracy aiming adjustment become possible.

In addition, the number of brackets for connecting the aiming mechanism provided on the light source unit can be reduced, and the formation of the lamp body and the reflector which are component members of the light source unit is facilitated.

In addition, the bracket is elongated in the vertical direction, and is liable to be deformed by that portion. However, the rearwardly extending projection provided on the light source unit abuts against a vicinity of the aiming-mechanism connecting portion, i.e., a point of application of force in the bracket, thereby effectively preventing the deformation of the bracket. Hence, smooth rotation of the aiming screw and high-accuracy aiming adjustment become possible.

In addition, the present invention is applicable to both the headlamp of the unit movable type and the headlamp of the reflector movable type. In the unit-movable headlamp, the front lens is formed integrally with the light source unit, and acts on the bracket as the load. Therefore, the prevention of deformation of the bracket by backing up the bracket by the rearwardly extending projection provided on the light source unit is particularly effective in the unit-movable type head lamp.

What is claimed is:

1. A headlamp for an automobile comprising:

a light source unit having a reflector and a light source mounted therein;

a housing disposed rearwardly of the light source unit and secured to a vehicle body;

an aiming mechanism interposed between the light source unit and the housing, for tiltably cantilevering the light source unit;

a bracket secured to a rear surface of the light source unit, for connecting the aiming mechanism; and a rearwardly extending projection provided on the rear surface of the light source unit, wherein the rearwardly extending projection abuts against the bracket to prevent the deformation of the bracket due to the self-weight of the light source unit.

2. The headlamp according to claim 1, wherein the rearwardly extending projection abuts against the bracket in a vicinity of the aiming-mechanism.

3. The headlamp according to claim 1, wherein the bracket has the shape of a plate, and the rearwardly extending projection is formed in the shape of a tongue having a width substantially corresponding to the width of the bracket.

4. The headlamp according to claim 1, wherein the bracket has a forwardly extending projection which abuts against a distal end of the rearwardly extending projection.

5. The headlamp according to claim 1, wherein the aiming mechanism comprises one universal joint including a tilting fulcrum and at least one aiming screw for tilting the light source unit, and wherein the universal joint is connected to the bracket secured to the light source unit and extending downward, and the rearwardly extending projection abuts against a lower extending end portion of the bracket.

6. The headlamp according to claim 1, wherein the aiming mechanism comprises one universal joint including a tilting fulcrum and at least one aiming screw for tilting the light source unit, and wherein the aiming screw is connected to the bracket secured to the light source unit and extending downward, and the rearwardly extending projection abuts against a lower extending end portion of the bracket.

7. The headlamp according to claim 1, wherein the aiming mechanism comprises one universal joint including a tilting fulcrum and at least one aiming screw for tilting the light source unit, and wherein the universal joint and the aiming screw are connected to the bracket secured to the light source unit and extending downward, and the rearwardly extending projection abuts against a lower extending end portion of the bracket.

8. The headlamp according to claim 1, wherein the aiming mechanism comprises a universal joint including a tilting fulcrum, a vertical aiming screw and a horizontal aiming screw, wherein the vertical aiming screw and the horizontal aiming screw are rotatably supported by said housing and respectively spaced apart vertically and horizontally from the universal joint, project forward, and are respectively connected to the light source unit, the bracket being formed in a vertically elongated belt shape capable of connecting together the universal joint and the vertical aiming screw, the rearwardly extending projection being provided so as to abut against the bracket in a vicinity of a lower one of two upper and lower aiming-mechanism connecting portions of the bracket.

9. The headlamp according to claim 1, wherein the light source unit comprises a lamp body/reflector unit in which a front lens is integrally assembled to a lamp body having a reflector formed integrally on an inner peripheral surface thereof, and the light source unit is tiltably supported with respect to the lamp housing by means of the aiming mechanism.

10. The headlamp according to claim 1, wherein the housing is the lamp body, and the light source unit is tiltably supported with respect to the lamp body by the aiming mechanism.

* * * * *